United States Patent [19]

Klass et al.

[11] Patent Number: 5,477,945
[45] Date of Patent: Dec. 26, 1995

[54] DRUM BRAKE ARRANGEMENT FOR VEHICLE AXLES

[75] Inventors: Thomas Klass, Reichshof; Joachim Flick, Wiehl, both of Germany

[73] Assignee: BPW Bergische Achsen Kommanditgesellschaft, Wiehl, Germany

[21] Appl. No.: 421,952

[22] Filed: Apr. 14, 1995

[30] Foreign Application Priority Data

Apr. 14, 1994 [DE] Germany .......................... 44 12 802.9

[51] Int. Cl.⁶ .................................................. F16D 65/52
[52] U.S. Cl. ..................................... 188/79.51; 188/79.55
[58] Field of Search .......................... 188/79.51, 79.55, 188/215, 196 BA; 192/111 A; 384/296

[56] References Cited

U.S. PATENT DOCUMENTS

| | | | |
|---|---|---|---|
| 2,379,796 | 7/1945 | Freeman et al. | 188/196 |
| 4,499,978 | 2/1985 | Norcross | 188/79.55 |
| 4,583,622 | 4/1986 | Ebbinghaus | 188/74.5 |
| 4,880,085 | 11/1989 | Taylor | 188/79.55 |

FOREIGN PATENT DOCUMENTS

| | | |
|---|---|---|
| 4036311 | 5/1991 | Germany . |
| 4017949 | 12/1991 | Germany . |

OTHER PUBLICATIONS

BPW-ECO-Master; Installation manual.

Primary Examiner—Robert J. Oberleitner
Assistant Examiner—Clifford T. Bartz
Attorney, Agent, or Firm—Robert W. Becker & Associates

[57] ABSTRACT

A drum brake arrangement for vehicle axles has an axle body and a support plate connected thereto. A bearing lever is fixed to the support plate. A brake camshaft has a first and a second end and is actuatable by a brake cylinder. The brake camshaft has a brake cam connected to the first end. A support bearing and another bearing for rotatably supporting the brake cam shaft on the axle body are provided. A slack adjuster is connected to the second end of the brake camshaft and has a housing with a cylindrical bore. The slack adjuster has a worm gear, connected to the brake camshaft, for adjusting the drum brake according to wear of the brake pads. The worm gear has a first profiled section extending parallel to its axis. The brake camshaft has a second profiled section extending parallel to its axis. The first and second profiled sections mesh with one another for fastening the worm gear on the brake camshaft. The slack adjuster has a bearing ring supported in the housing for receiving the bearing lever. The bearing ring has an outer mantle surface and is connected to the bearing lever. The worm gear has an outer mantle surface resting on a cylindrical inner surface of the cylindrical housing bore. The outer mantle surface of the worm gear and the bearing ring together constitute the bearing.

4 Claims, 3 Drawing Sheets

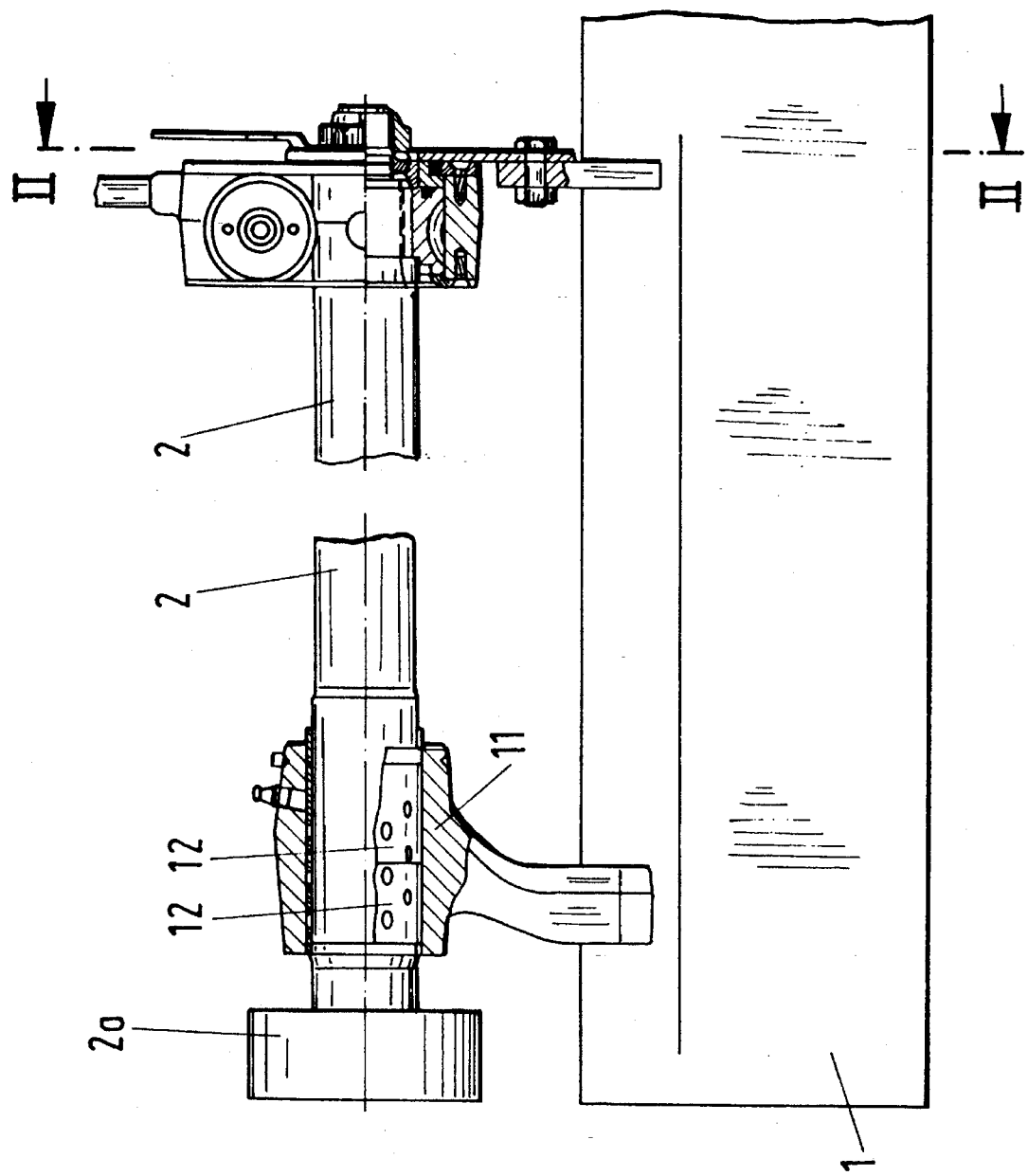

5,477,945

DRUM BRAKE ARRANGEMENT FOR VEHICLE AXLES

BACKGROUND OF THE INVENTION

The present invention relates to a drum brake arrangement for vehicle axles with a brake camshaft actuatable by a brake cylinder. The end of the brake camshaft carrying the brake cam is supported via a bearing on a carrier and the end that supports the slack adjuster is supported via a support bearing at the axle body whereby the slack adjuster is provided with a worm gear that is fixedly connected to the brake cam shaft for adjusting the drum brake arrangement according to wear of the brake pads. A bearing for a bearing lever that is fixedly connected to the axle body is provided also.

In the aforedescribed known construction the end of the brake camshaft supporting the slack adjuster is supported with a support bearing whereby the support bearing is comprised of a spherical bearing receiving the mantle surface of the brake camshaft in a cylindrical bearing bore and of bearing cups receiving the spherical bearing. The bearing cups are connected with screws to a support plate that is welded to the axle body. The support plate simultaneously serves for receiving a so-called fixed point holder that is connected with a lever to a bearing ring positioned within the housing of the slack adjuster so that the gear box of the automatic slack adjuster has a fixed point. Such a fixed point is required for the automatic adjustment of the brake camshaft according to the wear of the brake pads because the slack adjuster which is arranged on the brake camshaft simultaneously serves as the actuating lever for the brake cylinder.

It is therefore an object of the present invention to provide a drum brake arrangement of the aforementioned kind with which the number of components employed is to be reduced and with which the assembly is to be simplified.

SUMMARY OF THE INVENTION

The drum brake arrangement for a vehicle axle according to the present invention is primarily characterized by:

An axle body;

A support plate connected to the axle body;

A bearing lever fixedly connected to the support plate so as to be fixed relative to the axle body;

A brake camshaft having a first and a second end, the brake camshaft actuatable by a brake cylinder;

The brake camshaft comprising a brake cam connected to the first end;

A support bearing and a bearing means for supporting the brake camshaft on the axle body so as to be rotatable;

A slack adjuster connected to the second end of the brake camshaft, the slack adjuster comprising a housing with a cylindrical bore;

The slack adjuster further comprising a worm gear fixedly connected to the brake camshaft for adjusting the drum brake arrangement according to wear of the brake pads, wherein the worm gear has a first profiled section extending parallel to an axis of the worm gear and the brake camshaft has a second profiled section extending parallel to an axis of the brake camshaft, the first and second profiled sections meshing with one another so as to fasten the worm gear on the brake camshaft;

The slack adjuster further comprising a bearing ring supported in the housing for receiving the bearing lever, the bearing ring having an outer mantle surface, wherein the bearing ring is connected to the bearing lever;

The worm gear having an outer mantle surface resting on a cylindrical inner surface of the cylindrical bore of the housing; and Wherein the outer mantle surface of the worm gear and the outer mantle surface of the bearing ring together constitute the bearing means.

Expediently, the bearing lever is a fixed point holder for the gear box of the slack adjuster.

Preferably, the bearing ring has projections extending perpendicularly to the outer mantle surface in an axial direction of the bearing ring; the housing has a cover facing the bearing ring; the projections project outwardly from the housing through the cover; and the bearing lever has recesses for engaging the projections so as to connect the bearing lever and the bearing ring to one another.

Advantageously, the outer mantle surface of the bearing ring and the outer mantle surface of the worm gear are supported within the cylindrical bore of the housing.

According to the present invention, it is thus suggested that the bearing means is provided in the form of the outer mantle surface of the worm gear and the outer mantle surface of the bearing ring positioned within the housing of the slack adjuster, these outer mantle surfaces being supported on a cylindrical bore of the housing of the slack adjuster. The bearing ring is connected to the lever which is fixedly connected via a support plate to the axle body.

Due to the inventive embodiment the previously required additional support bearing comprised of a spherical bearing, bearing cups, and sealing means is now obsolete. Instead, the end of the brake camshaft carrying the slack adjuster is supported via the slack adjuster itself at the axle body. For this purpose it is only necessary to provide the slack adjuster with corresponding bearing surfaces which take over the support task of the previously provided separate support bearing. All in all, the inventive suggestion results in a reduction of the required components and a simplification of the assembly because all parts of the previously required additional support bearing are no longer needed.

According to a further feature of the present invention, the bearing lever of the slack adjuster, which is now used to support the brake camshaft, can simultaneously act as a fixed point holder for the gear box of the linkage controller. Due to this measure, the previously required fixed point holder as well as its connection to the fixed point lever extending from the slack adjuster housing are now obsolete.

In a preferred embodiment of the present invention the bearing ring which is supported within the housing of the linkage controller is provided with projections extending at a right angle to the outer mantle surface of the bearing ring. These projections extend through a side cover of the housing of the linkage controller and are connected to corresponding recesses provided at the bearing lever. This results in an especially simple and secure connection between bearing ring and bearing lever.

BRIEF DESCRIPTION OF THE DRAWINGS

The object and advantages of the present invention will appear more clearly from the following specification in conjunction with the accompanying drawings, in which:

FIG. 1 shows a partially sectioned view of a brake camshaft supported on an axle body;

DESCRIPTION OF PREFERRED EMBODIMENTS

The present invention will now be described in detail with the aid of the embodiments represented in FIGS. 1 through 7.

Figure 2:
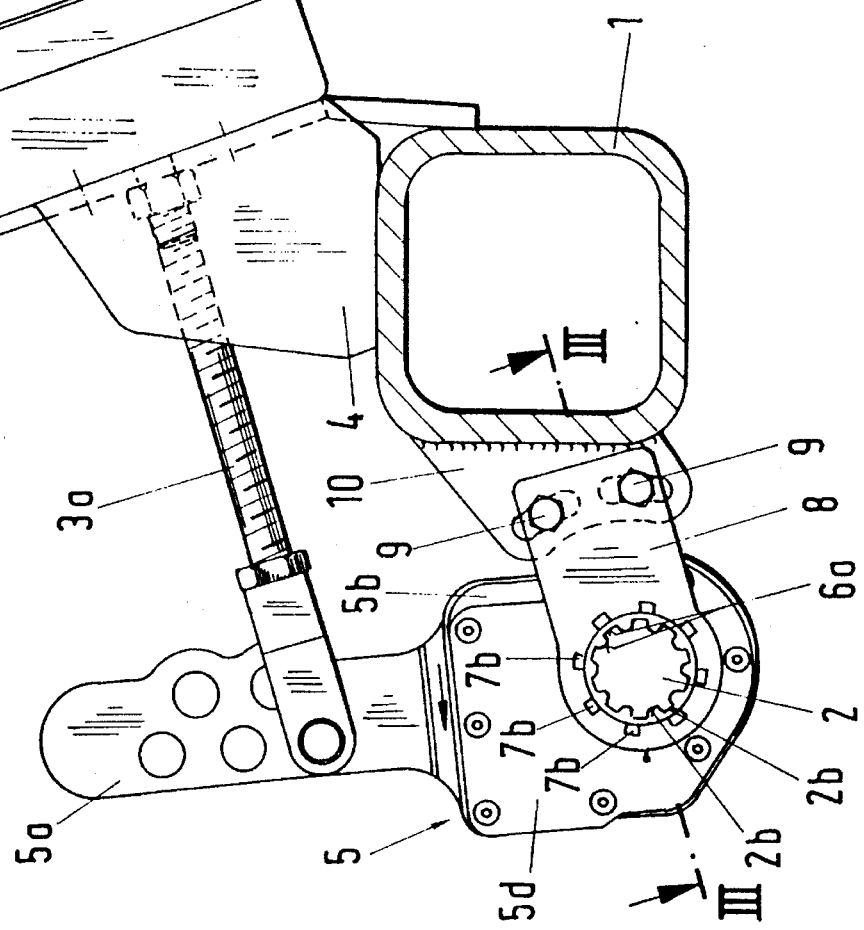
FIG. 2 shows a cross-section along line II—II of FIG. 2.

FIG. 1 shows one end of the axle body 1 which, according to FIG. 2, in the shown embodiment is formed of a tubular body of a substantially square cross-section. A brake camshaft 2 is rotatably supported on the axle body 1 whereby the brake cam 2a serves for actuating the brake shoes of the drum brake (not represented in the drawings).

The rotation of the brake camshaft 2 which results in a braking action is caused by a brake cylinder 3 that is connected via a support structure 4 at the axle body 1. The piston rod 3a is connected to the lever arm 5a of an automatic slack adjuster 5. This slack adjuster 5 comprises a gear box with which the initial position of the brake camshaft 2 can be automatically adjusted according to the wear of the brake pads.

This gear box, which is arranged within a housing 5b embodied as a unitary part together with the lever arm 5a of the slack adjuster 5, comprises a worm gear 6 that has a profiled section which extends parallel to its axis, for example, in the form of a spline profile 6a or an external spline. This profiled section 6a is slipped onto a corresponding profiled section 2b of the camshaft 2 so as to be fixedly and without play connected thereto. The cross-section of the profiled sections embodied in the shown embodiment as spline profiles 2b and 6a are shown in FIG. 2.

Figure 4:
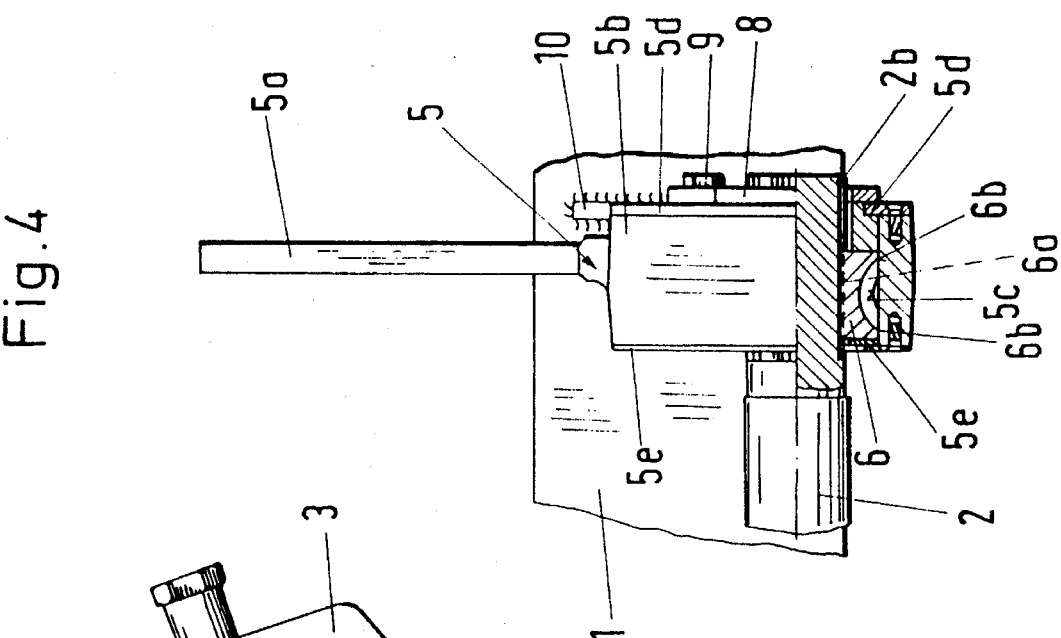
FIG. 4 shows an enlarged and partially sectioned view of the slack adjuster supported on one end of the brake camshaft.
Figure 3:
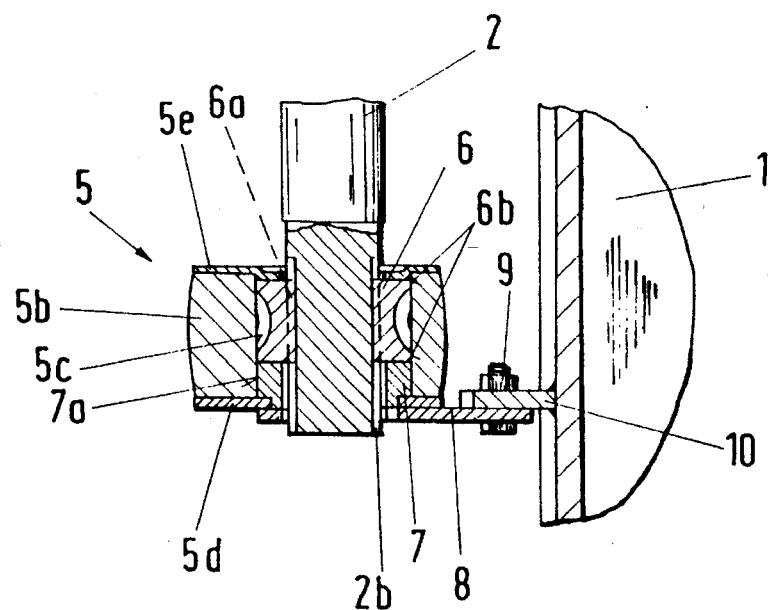
FIG. 3 shows a further section along section III—III of FIG. 2.
Figure 6:
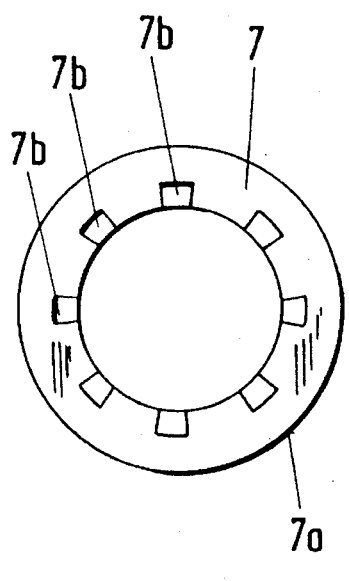
FIG. 6 shows an end view of the bearing ring.
Figure 5:
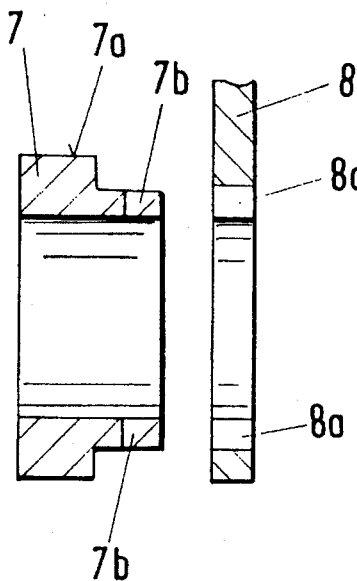
FIG. 5 shows a sectional view of the connection between bearing ring and bearing lever before being connected to one another.
Figure 7:
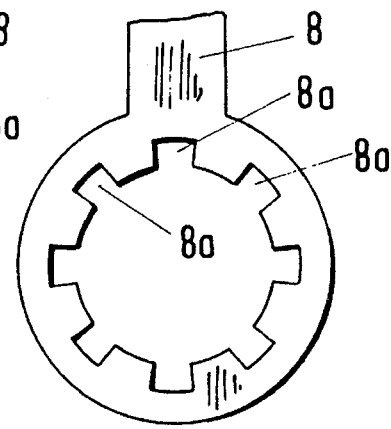
FIG. 7 shows a side view of the bearing lever.

As can be taken from FIGS. 3 and 4, the worm gear 6 is provided on both sides with an annular mantle surface 6b which, as a bearing surface, is supported in a cylindrical bore 5c of the housing 5b. Adjacent thereto, the cylindrical bore 5c simultaneously serves as a bearing surface for the cylindrical mantle surface 7a of the bearing ring 7 which is fixedly connected to the bearing lever 8. One embodiment of this fixed connection between bearing ring 7 and bearing lever 8 is shown in FIGS. 5 to 7.

As is shown in this embodiment, the bearing ring 7 is provided with projections 7b that extend at a right angle to the mantle surface 7a. These projections are used to connect the bearing ring 7 to the bearing lever 8 which for this purpose is provided with corresponding recesses 8a. FIGS. 3 and 4 show that these projections 7b and recesses 8a provide for a fixed connection between the bearing ring 7 and the bearing lever 8 when the bearing ring 7 is inserted into the cylindrical bore 5c of the housing 5b and the end face of the housing 5b is closed off by the cover 5d.

According to FIGS. 2 to 4, the bearing lever 8 is connected with screws 9 to a support plate 10 that itself is welded to the axle body 1. A cover 5e corresponding to the cover 5d closes off the opposite side of the housing 5b of the slack adjuster 5.

By fastening the bearing lever 8 with screws 9 to the support plate 10 and by fixedly connecting the bearing lever 8 and the bearing ring 7 a pivotable support of the slack adjuster 5 is achieved via the respective bearing surfaces of the mantle surfaces 7a of the bearing ring 7 and the cylindrical bore 5c of the housing 5b. Since the cylindrical bore 5c and the housing 5b of the slack adjuster 5 serves simultaneously as a bearing surface for the annular mantle surfaces 6b of the worm gear 6, which is fastened with the spline profiles 2b and 6a on the brake camshaft 2, the end of the brake camshaft 2 that supports the slack adjuster 5 is thus directly supported on the axle body 1. A separate bearing means is therefore obsolete.

Since the bearing ring 7 is non-rotatably supported at the axle body 1 due to the fixed connection with the bearing lever 8 and the support plate 10, it can be used simultaneously as a fixed point of the gear box positioned within the slack adjuster 5. In this manner the previously required fixed point holder and fixed point lever are no longer needed.

The aforedescribed construction thus reduces the number of components for supporting the brake camshaft 2 and for providing a fixed point for the gear box of the slack adjuster 5. Furthermore, the assembly of the drum brake arrangement is simplified. The support bearing which is required for supporting the end of the brake camshaft 2 supporting the brake cam 2a can be seen in FIG. 1. This support bearing is comprised of a bearing arm 11 which is fastened to the axle body 1. The support bearing comprises bearing cups 12 positioned in its bore which cooperate with the cylindrical mantle surface of the brake camshaft 2.

The present invention is, of course, in no way restricted to the specific disclosure of the specification and drawings, but also encompasses any modifications within the scope of the appended claims.

What we claim is:

1. A drum brake arrangement for a vehicle axle, said drum brake arrangement comprising:

an axle body;

a support plate connected to said axle body;

a bearing lever fixedly connected to said support plate so as to be fixed relative to said axle body;

a brake camshaft having a first and a second end, said brake camshaft actuatable by a brake cylinder;

said brake camshaft comprising a brake cam connected to said first end;

a support bearing and a bearing means for supporting said brake camshaft on said axle body so as to be rotatable;

a slack adjuster connected to said second end of said brake camshaft, said slack adjuster comprising a housing with a cylindrical bore;

said slack adjuster further comprising a worm gear fixedly connected to said brake camshaft for adjusting said drum brake arrangement according to wear of the brake pads, wherein said worm gear has a first profiled section extending parallel to an axis of said worm gear and said brake camshaft has a second profiled section extending parallel to an axis of said brake camshaft, said first and second profiled sections meshing with one another so as to fasten said worm gear on said brake camshaft;

said slack adjuster further comprising a bearing ring supported in said housing for receiving said bearing lever, said bearing ring having an outer mantle surface, wherein said bearing ring is connected to said bearing lever;

said worm gear having an outer mantle surface resting on a cylindrical inner surface of said cylindrical bore of said housing; and wherein said outer mantle surface of said worm gear and said outer mantle surface of said bearing ring together constitute said bearing means.

2. A drum brake arrangement according to claim 1, wherein said bearing lever is a fixed point holder for the gear box of said slack adjuster.

3. A drum brake arrangement according to claim 1, wherein:

said bearing ring has projections extending perpendicularly to said outer mantle surface in an axial direction of said bearing ring;

said housing has a cover facing said bearing ring;

said projections project outwardly from said housing through said cover; and said bearing lever has recesses for engaging said projections so as to connect said bearing lever and said bearing ring to one another.

4. A drum brake arrangement according to claim 1, wherein said outer mantle surface of said bearing ring and said outer mantle surface of said worm gear are supported within said cylindrical bore of said housing.

* * * * *